PUSH-BUTTON CHANNEL SELECTING UNITS FOR MULTIBAND RECEIVERS HAVING CAPACITANCE DIODE TUNING MEANS
Filed Feb. 15, 1968 6 Sheets-Sheet 1

Inventors:

Inventors:

V. Eglich H. Hauer

Inventors:

W. Labude H. Frauer

April 21, 1970 W. LABUDE ET AL 3,508,176
PUSH-BUTTON CHANNEL SELECTING UNITS FOR MULTIBAND RECEIVERS
HAVING CAPACITANCE DIODE TUNING MEANS
Filed Feb. 15, 1968 6 Sheets-Sheet 4

Inventors:
W. Labude H. Bauer

April 21, 1970 W. LABUDE ET AL 3,508,176

PUSH-BUTTON CHANNEL SELECTING UNITS FOR MULTIBAND RECEIVERS HAVING CAPACITANCE DIODE TUNING MEANS

Filed Feb. 15, 1968 6 Sheets-Sheet 5

Inventors:

Inventors:

United States Patent Office 3,508,176

Patented Apr. 21, 1970

3,508,176

PUSH-BUTTON CHANNEL SELECTING UNITS FOR MULTIBAND RECEIVERS HAVING CAPACITANCE DIODE TUNING MEANS

Wolfgang Labude, M. Luthes Str. 23½, and Karlheinz Bauer, Muhlbach Rhonlick 22, both of Bad Neustadt, Saale, Germany Filed Feb. 15, 1968, Ser. No. 705,781
Claims priority, application Germany, Feb. 18, 1967, P 41,444; Mar. 4, 1967, P 41,550; Mar. 14, 1967, P 41,633
Int. Cl. H03j 5/04
U.S. Cl. 334—7 20 Claims

ABSTRACT OF THE DISCLOSURE

Channel selecting unit for high-frequency receivers, particularly television sets, having at least two frequency bands, comprising a number of channel stores and mutually releasing, rotatable and slidable push-buttons for channel switching, channel tuning and band selection. The push-buttons are manually movable into a pulled-out or pushed-in position for carrying out certain functions while other functions of selecting, switching and tuning are carried out by rotating the push-buttons and/or by bringing them into the opposite longitudinal pushed-in or pulled-out position, respectively.

Figure 1:
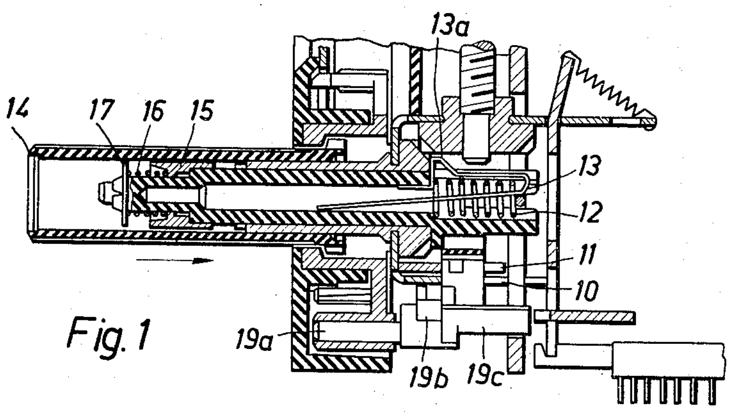

This invention relates to push-button channel selecting units for HF receivers, more particularly television sets, having at least two frequency bands and a number of channel stores comprising voltage dividers for capacitance-diode tuning, in which channel switching, channel tuning and frequency band selection can be carried out by means of mutually releasing, rotatable and slidable push-buttons.

In many respects, the present invention relates to further developements and improvements of the inventions disclosed in co-pending application Ser. No. 491,708, filed Sept. 30, 1965, of which the inventors of the present application are co-inventors and which in some respects will be helpful in understanding the following disclosure of the present invention.

It is an object of the invention to provide a push-button channel selecting unit having a simple and stable construction.

A further object is to develop the unit so that it has high working reliability and accuracy of repetition, that is to say, the frequency values once stored are affected as little as possible by repeated switching operations.

Another object is to render the unit as simple to operate as possible and insensitive to unintentional alterations.

Another object is to indicate the adjusted bands and channel numbers as clearly and distinctly as possible.

According to the invention, there is provided a push-button channel selecting unit for HF receivers, more particularly televison sets having at least two frequency bands and a number of channel stores comprising voltage dividers for capacitance-diode tuning, in which by mutually releasing, rotatable and slidable push-buttons, it is possible to carry out channel switching, channel tuning and frequency band selections, wherein the individual channel stores are so constructed that with the push-button in a position, preferably a pulled-out position, different from its inoperative and switching position, an adjusting element is adapted to be coupled and rotated, by means of which the switching members of the band switch are adjustable to a pre-selection position associated with the particular band, in which position by the longitudinal sliding of the push-button, the said sliding effecting channel switching, the switch contacts of the pre-selected band are actuated, by means of which the channel scale, associated with the particular band, of a slide provided with all the channel scales is adjusted in the corresponding window for channel indication.

In this change-over of the channel stores to different frequency bands, the push-button channel selecting unit may be constructed with the same dimensions as or with only slightly larger dimensions than in the case of a single-band unit. Neither in the band changeover nor in channel switching, do detrimental effects occur on the pre-adjusted sliders of the voltage dividers, so that good accuracy of repetition is ensured. By the sliding of the scale slide, always only the scale of the pre-selected band is visible, so that the programming of the set is always clearly recognizable, even in the switched-off condition.

In an advantageous development of the coupling between the push-button and the rotatable adjusting element, it is proposed to mount the latter with an annular par concentrically with the push-button and to provide it with internal teeth engaged by a suitable toothed crown of the push-button when the latter is pulled out of the inoperative position to the band selecting position. It is here advantageous to pre-stress the push-button with a return spring which, after rotation of the adjusting element, returns the push-button automatically to the inoperative position. Since only a comparatively small rotation of about 30°–45° is necessary for actuating the adjusting element, it is not detrimental to operation that in band selection the push-button must be held simultaneously in the pulled-out position and rotated.

For band pre-selection and band switching, it is proposed in a first development to rotate by means of the rotatable adjusting element, a control element, movable on a circular path and in its longitudinal axis, to a pre-selection position associated with the particular frequency band and to actuate the switch contacts serving for band selection by a longitudinal displacement of the said control element, which is effected by longitudinal displacement of the push-button in channel switching by means of one or more pivotally connected intermediate elements.

In an advantageous development of the control element, the latter has a rear guide pin which is slidably mounted in a sleeve mounted parallel to the push-button axis on an arm of the adjusting element and lateral recesses, by means of which it is guided on a segment-shaped part of a switching element which, on channel switching, is pressed by the push-button into the arrested working position.

In this arrangement, the control element is rotatable by means of the coupled push-button on a circular path concentric with the push-button axis, on which path a number of positions of the control element associated with the individual frequency bands, are fixed by suitably arrested positions of the adjusting element. In each of these pre-selectable positions, the control element on the push-button being pressed in is displaced by the segment-shaped part of the switching element, which is moved by the push-button in the same direction, in its longitudinal axis with the same travel as the switching element, the sleeve in the adjusting element serving as guide. A front pusher of the control element here acts on one or more intermediate elements, common to all the channel stores, for the band selecting switches. In the reverse direction, the control element is returned to the starting position when, by pressing another push-button, the last push-button situated in the working position is released in known manner together with its switching element and brought into the inoperative position by a return spring.

In a first advantageous development, the intermediate element for actuating the band selecting switch forms a pivotally mounted, spring-loaded switching flap, which is common to all the channel stores, and the bent end of which, situated in the range of action of the pushers, is recessed in step fashion. These steps are associated with the pre-selection positions of the control elements in a manner such that the switching flap, on axial displacement of the control element, is deflected to different degrees, thus producing different travels, associated with the various frequency bands, of a sliding switch, known per se, controlled by the switching flap.

In a further development according to the invention, the pushers of the control elements act on two pivotally mounted, spring-loaded switching flaps, common to all the channel stores, and provided, in the range of action of the pushers, with recesses or contours, such that according to the pre-selection position of the control element, each pusher deflects the first, second or none of the two switching flaps. In a suitable development of the pusher, for example, suitable widening of its end face, it may also deflect both switching flaps simultaneously in a fourth position of the control element. With this arrangement also, the switching flaps actuate sliding switches producing band change-over.

In an advantageous and economic further development, the switching flaps may also directly deflect resiliently fixedly clamped, resilient, preferably wire, contact tongues, which according to the arrangement of the counter-contacts, act as operative, inoperative or switch-over contacts. Since the switching flaps are preferably made of metal, the contact tongues are advantageously provided with insulating pieces at the point of engagement of the switching flaps. Since the contact tongues require only small deformation forces, a number of switch contacts may be controlled by one switching flap without the force required for actuating the push-button attaining an undesirable degree. These switch contacts, spatially arranged directly on the switching flaps, are particularly suitable for electronic band change-over by means of switch diodes, which in their turn may be used at the most favourable places of the tuner from the high-frequency standpoint.

In this development of band pre-selection, displacement of the push-button to the switch-on position may actuate simultaneously a number of separate independent switching contacts of the band switch.

For receiving circuits in which for band change-over only one working contact is always to be operated, such as for example in indirect electromagnetic band change-over, it is proposed in a further simplified development of the invention to mount the movable band switch contacts directly on the rotatable adjusting elements and to construct the latter as switch rotors of step switches, the step contacts of which, corresponding to each other and always associated with a frequency band, are connected together, and the conductive connection between the collector bar of the step switch and its counter-contacts mounted on the switch rotors and lifted off the channel stores in the inoperative position is established by their resilient deflection by means of a segment-shaped part of the switching element, which, on channel switching, is shifted by the push-button into the arrested switch-on position.

With this arrangement, for each channel store, by rotation of the switch rotor to the corresponding switch step, the working contact of each frequency band is pre-selectable and, on channel switching by pressing of the push-button, it can be switched into its arrested working position.

In an advantageous development, the moving contact on the switch rotor has a radial part co-operating with the step contacts and a part serving as counter-contact for the collector bar, substantially parallel to the rotor axis and provided with a band, which co-operates with the segment-shaped part of the switching element on its displacement to the arrested switched-on position.

In an advantageous development, the collector bar of the step switch, in the range of action of the rotor counter-contacts, has T-shaped extensions, the transverse arms of which are arcuate in adaptation to the circular movement of the rotor.

The step contacts may also be used as single contacts and in each case the corresponding groups may be connected together by corresponding soldered-on bars. They may also be formed as printed conductive lines on an insulating material plate, together with their connection, by known printed circuit techniques.

In a further development, the step contacts and their connections may be made in one piece of conductive material and inserted in suitable grooves in the unit frame. In this case, the contact surfaces of the step contacts may be embossed in trough fashion, so that, in co-operation with the convex rotor contacts, arrestment of the rotor in the different steps is obtained.

If the unit according to the invention is used for a receiving set, in which the band switches are actuated by pulse-controlled electromagnets, it is proposed in an advantageous development of the invention to produce the switching pulses for the electromagnets by a switch, which is closed for a short time by displacement of the locking bar during channel change-over.

The scale slide for band indication is displaced in change pre-selection always by a lever mounted on the adjusting element such that only the channel scale associated with the band appears in the window. For the operator, therefore, there is the same impression as in the case of a channel store belonging to only one band.

The multiple scale and the displacement travel thereof results in a certain additional space requirement with the slides of the individual channel stores arranged adjacent one another. On the other hand, for obtaining high stability of shape, which is decisive for accuracy of repitition, there is a requirement to make the spatial dimensions as small as possible.

For a development which is advantageous in this connection, it is proposed to arrange the slides in roof-tile fashion, that is to say, with a small inclination to the plane of their centre axes, with the possibility of mutual overlapping of partial regions. In this case, on the adjustment of the slides, the scales not appearing in the window slide over each other, so that the spacing of the windows and hence also of the channel stores may be made correspondingly smaller. Maximum width of the slide is here determined by the requirement that in the extreme positions it should not project into adjacent windows.

To provide the slide with the surest possible guiding, it is proposed in a further favourable development to extend on both sides the slide edge ledges, situated outside the windows and serving as guides. By this means, on engagement of the adjusting element on a narrow side of the slide, easy slidability is obtained and any jamming by possible tilting of the slide is prevented.

Figure 2:
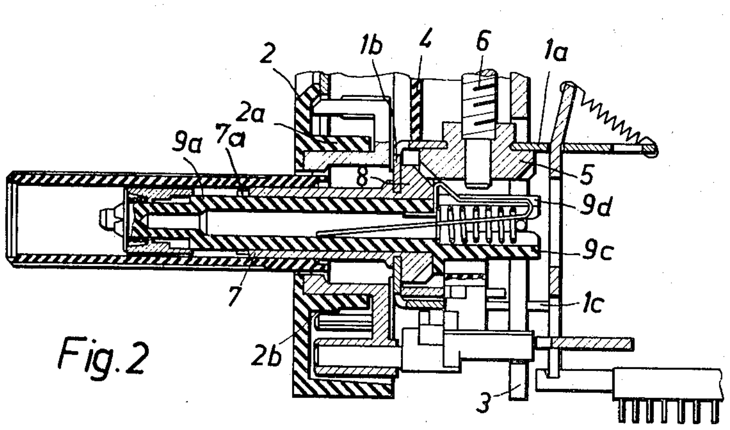
Figure 3:
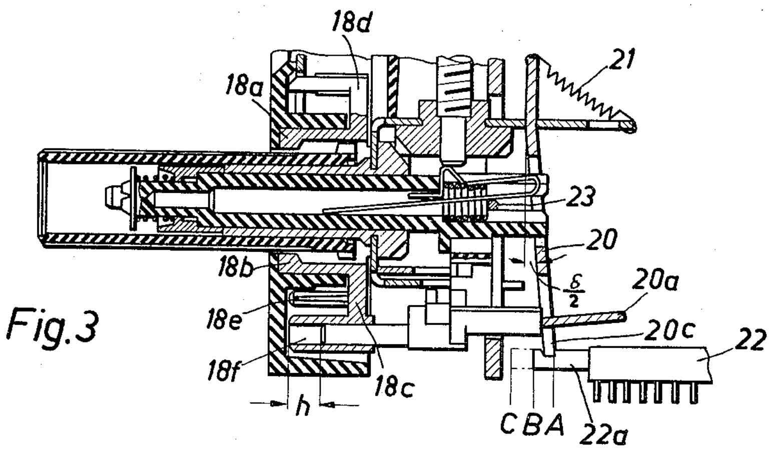
Figures 4, 5:
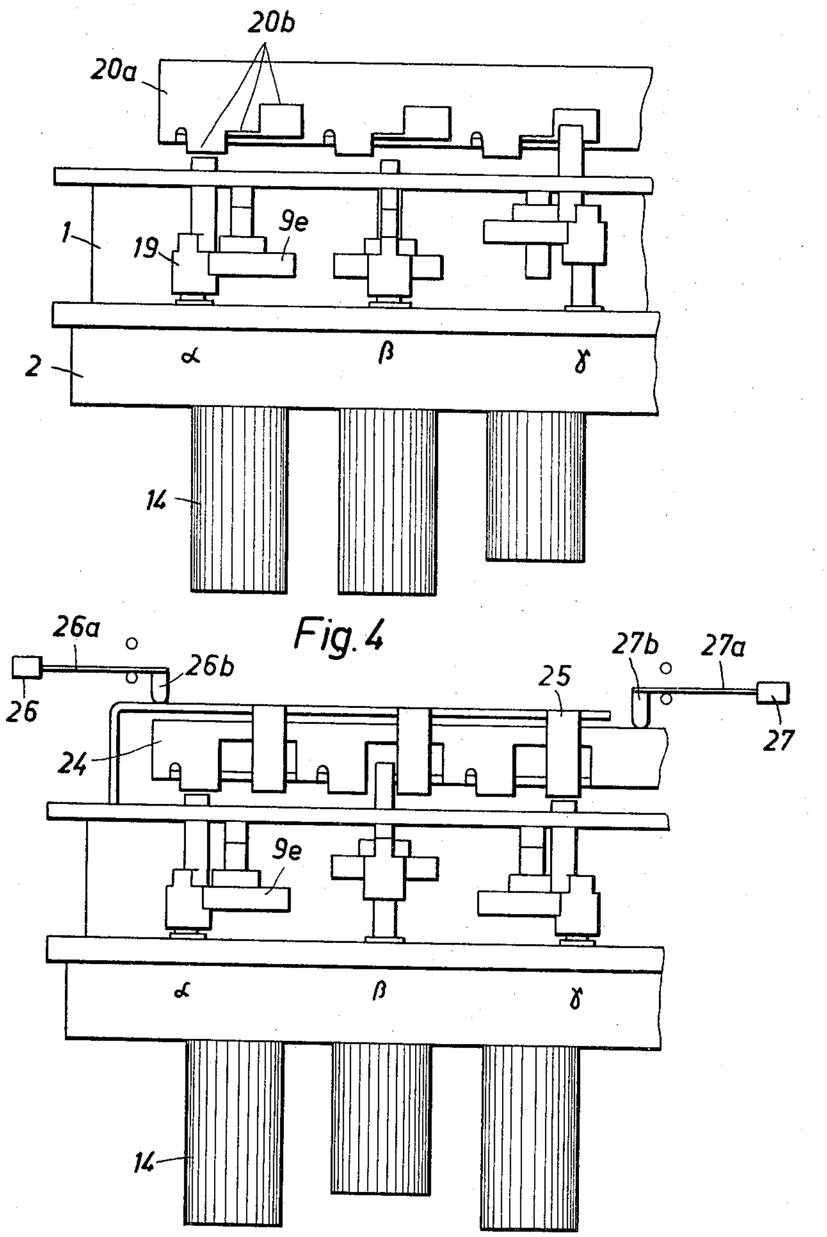
Figure 6:
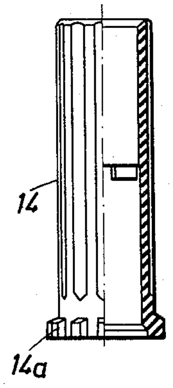
Figure 8:
Figure 9:
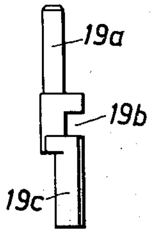
Figure 10:
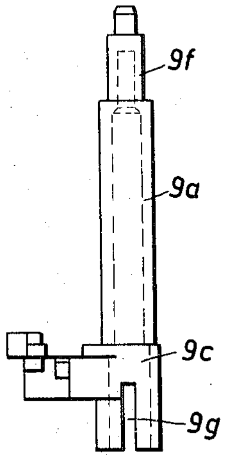
Figure 7:
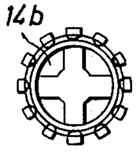
Figure 11:
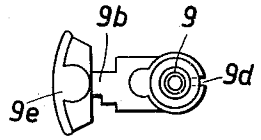
Figure 12:
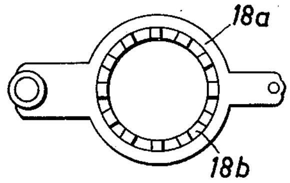
Figure 14:
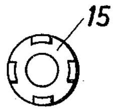
Figure 13:
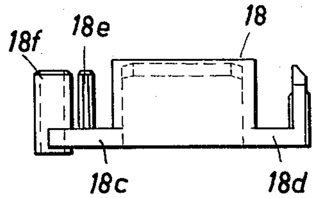
Figure 15:
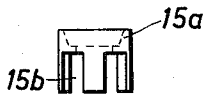
Figure 16:
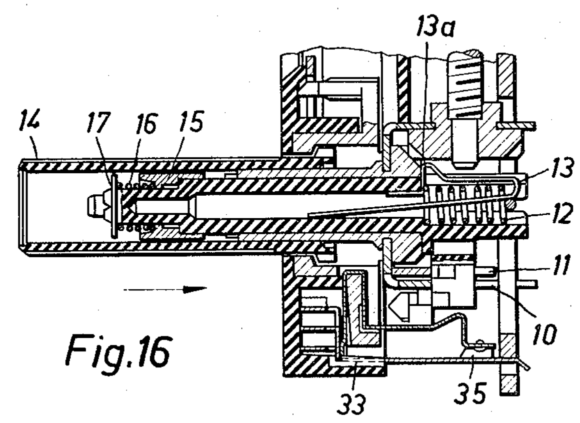
Figure 17:
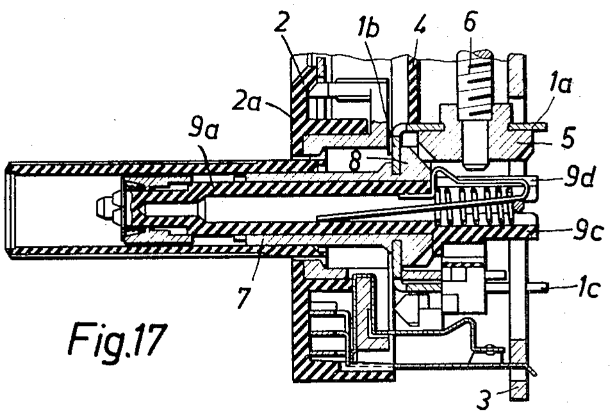
Figure 18:
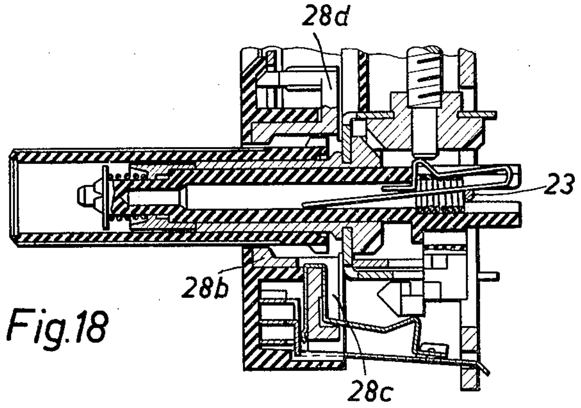
Figure 19:
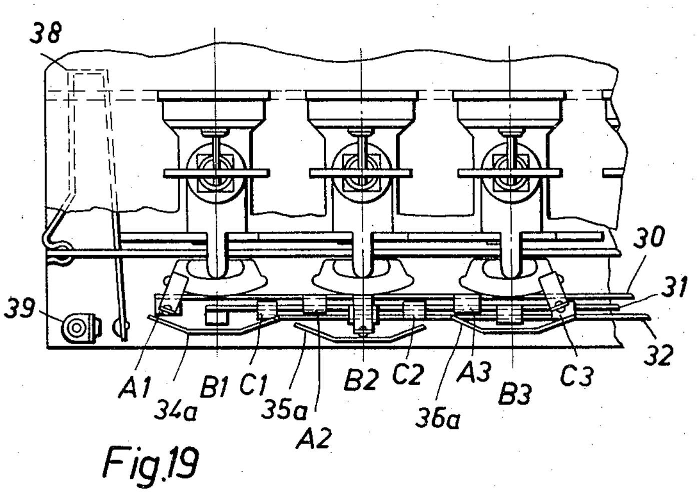
Figure 20:
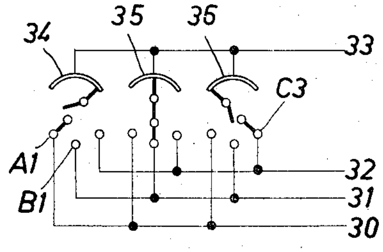
Figure 21:
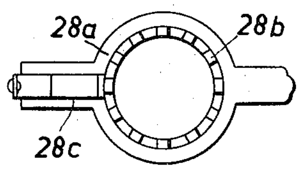
Figure 22:
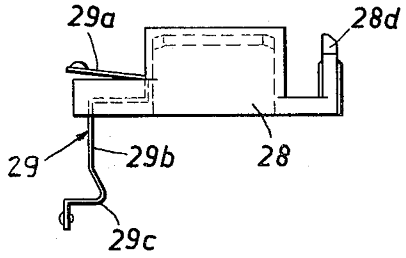
Figure 24:
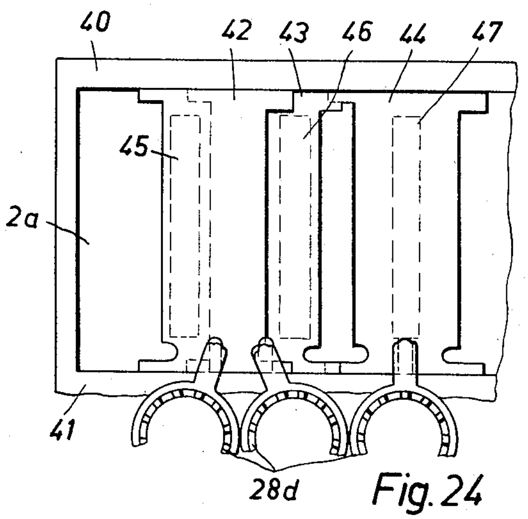
Figure 23:
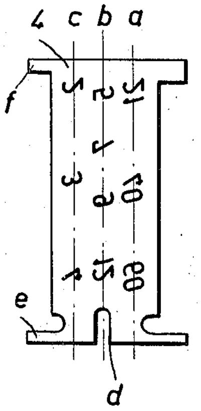
Figure 25:
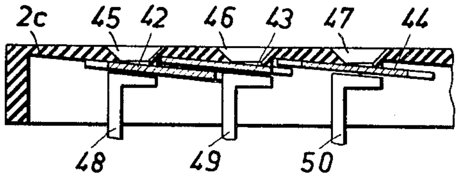
Figure 26:
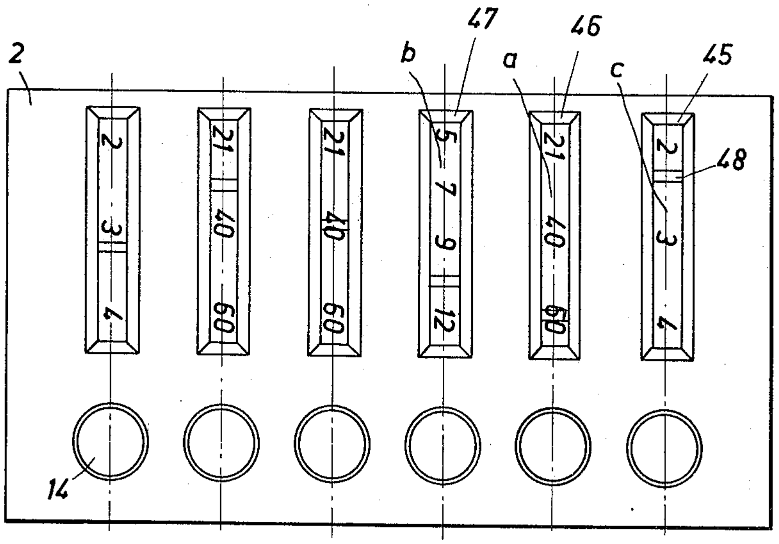

For a better understanding of the invention, the same will now be more fully described, by way of example, with reference to the accompanying drawings illustrating two embodiments of a push-button channel selecting unit for a television set with capacitance-diode tuning and three frequency bands, the first embodiment being provided with flap control of the band switches and the second with step switching of the band switch. In the drawings:

FIGURE 1 shows in respect to a first embodiment of the present invention a section through the centre axis of the operating device of a channel store in the inoperative position, FIGURE 2 shows the same section of the operating device in the band selecting position, FIGURE 3 shows the same section of the operating device in the switching position of the channel store, FIGURE 4 shows a plan of a part of the unit with three channel stores and one switching flap, FIGURE 5 shows a plan of part of the unit with three channel stores and two switching flaps, FIGURES 6 and 7 show a side and plan view, respectively, of the push-button, FIGURES 8 and 9 show a plan and side view, respectively, of the control element, FIGURES 10 and 11 show a side and plan view, respectively, of the switching element, FIGURES 12 and 13 show a plan and side view, respectively, of the adjusting element, FIGURES 14 and 15 show a plan and side view, respectively, of the coupling piece, FIGURE 16 shows in respect to a second embodiment of the invention a section through the centre axis of the operating device of a channel store in the inoperative position, FIGURE 17 shows the same section of the operating device in the band selecting position, FIGURE 18 shows the same section of the operating device in the channel-store switching position, FIGURE 19 shows the back view of part of the unit with three channel stores, FIGURE 20 is a diagrammatic view of the band-switching means, FIGURES 21 and 22 show a plan and side view, respectively, of the switch rotor, FIGURE 23 shows a rear view of an individual scale slide, FIGURE 24 shows part of the channel-indicating device with three slides, viewed from the back, FIGURE 25 shows a section of the said part, and FIGURE 26 shows the front view of the complete channel-selecting unit.

In the first embodiment according to FIGURES 1 to 15, fixed to a U-shaped carrier rail 1 on its centre wall 1*b* is a front plate or panel 2, and to the open rear side is a carrier plate 3, between which is a frame 4. In an upper side wall 1*a* of the carrier rail there is rotatably mounted for each channel store a bevel wheel 5, which is rigidly connected to a screwthreaded spindle 6 of a voltage divider, not shown, for the adjustment of the diode voltage. Meshing with this bevel wheel is a second bevel wheel 8 rotatably mounted in the centre wall 1*b* by means of a hollow shaft 7. In the end face of the hollow shaft are four recesses (7*a*) spaced apart by 90°.

The switching element 9 is guided by means of a cylindrical hollow pin 9*a* in the hollow shaft 7 and by means of a cross-piece 9*b*, cast on laterally to a head part 9*c*, in a recess 10 of the lower side wall 1*c* of the carrier rail, so that it is axially slidable in the hollow shaft 7, but is not rotatable therein. A spring-loaded locking bar 11, guided on the carrier wall 1*c* and common to all the channel stores, co-operates with the cross-part 9*b* and the return spring 12 such that the switching element 9 on displacement from the inoperative position (FIGURE 1) is arrested in the switch-on position (FIGURE 3) behind a catch nose of the locking bar 11 and, on the switching on of another channel store, is brought into the inoperative position again by the return spring 12.

Inserted in the interior of the switching element 9 is a hairpin-shaped contact spring 13, which is supported resiliently by its two legs against the inner walls and projects with a bend 13*a* through slot 9*d* to the outside. Connected to the head part 9*c* by means of the cross part 9*b* is a segment-shaped part 9*e*, the centre of the circular arc of which lies in the centre axis of the switching element.

A push-button 14, constructed as a hollow cylinder, is rotatably and axially slidably mounted by a rear part on the hollow shaft 7. At one end situated behind the front plate 2, the push-button has an external toothed crown 14*a* and in its bore four projections 14*b*, the cross-shaped inner profile of which is adapted to the four recesses 7*a* of the hollow shaft and which, in the inoperative position, bear on the annular shoulder of the pin 9*a*. In the front cavity of the push-button there is, pushed onto the offset pin end 9*f* of the switching element, a coupling piece 15 which has an annular part 15*a* and four pins 15*b* connected to said annular part, these pins extending in the axial direction and fitting in the recesses 7*a* of the hollow shaft. The coupling piece 15 is resiliently urged by a helical spring 16 against a washer 17 on the end of the pin 9*f*.

An adjusting element 18 is rotatably mounted concentric with the push-button 14 by means of an annular part 18*a* in the sleeve-like extension 2*a* of the front plate. In the annular part are internal teeth 18*b*, the pitch of which agrees with that of the outer teeth 14*a* of the push-button. Provided on the outside of the ring 18*a*, diametrically opposite each other, are lever arms 18*c* and 18*d*, of which the latter serves for controlling the scale slide. Cast on the lever arm 18*c* is a pin 18*e* which, in combination with the studs 2*b* on the external periphery of the sleeve 2*a* forms an arrestment for three preferred angular positions of the adjusting element 18.

Cast on the end of the lever arm 18*c* is a sleeve 18*f*, the longitudinal axis of which extends parallel to the centre axis of the adjusting element. A control element 19 is inserted for sliding in its longitudinal axis by means of a rear guide pin 19*a* in the said sleeve. Engaging a lateral recess 19*b* of the control element is the segment 9*e* of the switching element. With this arrangement, the control element 19 can be adjusted by means of the adjusting element 18 on a circular path concentric with the centre axis of the channel store to three angular positions $\alpha$, $\beta$, $\gamma$, predetermined by the arresting device 2*b*/18*e*, in which positions on displacement of the switching piece 9 it is moved to the arrested working position by the stroke $h$ (FIGURE 3) in the direction of the arrow (FIGURE 1).

In the carrier rail wall 1*a* a switching flap 20, common to all the channel stores, is hingedly mounted, the flap having a bent end 20*a* so arranged that the switching flap is rotated by a pusher 19*c* of the control element on its displacement in the direction of the arrow against the action of the spring 21. In the range of action of each control element, the end 20*a* is provided with a step-shaped recess 20*b*, with which the angular positions $\alpha$, $\beta$, $\gamma$, of the control element 19 are so associated that in the position $\alpha$ the switching flap is deflected by the full deflection angle $\delta$, in the position $\beta$ by about $\delta/2$, and in the position $\gamma$ it is not deflected at all. Thereby associated with the three positions $\alpha$, $\beta$, $\gamma$ of the control element 19 are the three stroke positions A, B, C of the switch slide 22 of the band selecting switch pivoted to the end edge 20*c* of the switching flap 20.

The push-button channel selecting unit operates as follows:

In the inoperative position (FIGURE 1), the push-button 14 is freely rotatable since neither the bevel wheel 8 for driving the screwthreaded spindle nor the adjusting element 18 are coupled in. In this position, therefore, no unintentional alteration of the adjusted channel tuning can occur.

For switching on the channel store, the push-button 14 is pressed in the direction of the arrow. The axial displacement of the push-button is transmitted by its projections 14*b* to the switching element 9 which, by its cross-part 9*b*, displaces the spring-loaded locking bar 11 perpendicularly to the plane of the drawing and hence releases the channel store last switched on and shown on the right in FIGURE 4 and, after reaching the full switching stroke (FIGURE 3), is itself locked by the locking bar 11. At the same time, also the contact spring 13 is shifted so far in the direction of the arrow that its bend 13*a*, projecting through the slot 9*d*, runs with pre-stressing onto the end of the screwthreaded spindle 6 and hence makes conductive connection between the latter and the collecting bar 23 extending perpendicularly to the plane of the drawing, inserted in the slots 9*g* of the switching elements and made of wire. Since the spindle is conductively connected to the wiping contact of the voltage divider, voltage adjusted in this channel store is thereby supplied by the bar 23 to the tuning diode or diodes.

On switching on, at the same time the control element 19, by means of the interlocking connection of its recess 19*b* with the segment 9*e* of the switching piece, is shifted to the right by the distance *h*. Since the control element of the channel store shown in FIGURES 1 to 3 is in the position $\beta$, it deflects the switching flap 20 through half the angle $\delta$ and brings the switch slide 22 to position B which in this case effects the necessary connections for the associated frequency range for example of television band I.

In the case of the previously switched on channel store shown on the right in FIGURE 4, the control element is in the position $\gamma$, in which the swiching flap 20 is not deflected at all by the control element. The switch slide therefore assumes the position C, which is associated for example with the television band III.

In the switched-on position (FIGURE 3), the channel store is tunable by rotation of the pushbutton, which takes place as follows. On pressing in the push-button, the ends of the longitudinal pins 15*b* of the coupling piece under the action of the helical spring 16 rest resiliently on the end of the hollow shaft 7. On rotation of the push-button, the pins 15*b*, carried into the inner profile 14*b* of the pushbutton, snap under the action of the spring 16 into the corresponding recesses 7*a* of the hollow shaft of the bevel wheel 8. The push-button 14 is thereby coupled by the bevel gear 8/5 to the screwthreaded spindle 6, so that the internally screwthreaded slider moving on it and not shown is adjustable by rotation of the push-button. On disengagement of the switching piece, the coupling piece is also carried back, thereby releasing the coupling between the push-button and the screwthreaded spindle.

Pre-selection of the individual frequency bands is carried out by means of the push-button 14 as follows. The push-button is pulled in a direction opposite to that of the arrow and against the action of the spring 16 and is held in this position (FIGURE 2). The external teeth 14*a* of the push-button are thereby brought into engagement with the internal teeth 18*b* of the adjusting element so that now, by means of the push-button, the control element 19 can be changed over selectively from position $\beta$ to the position $\alpha$ or $\gamma$. After completion of this band pre-selection, on release of the push-button, which then returns to the inoperative position (FIGURE 1), the coupling between the push-button and the adjusting element is disengaged automatically.

FIGURE 5 shows a modification of the first embodiment in that the control elements 19 do not co-operate with one stepped switching flap but with two switching flaps 24, 25, which are also hingedly mounted on the carrier rail 1. In this case, the switching flaps in the range of action of the controlling elements 19 are recessed in such a manner that in position $\alpha$ the flap 24, in the position $\beta$ neither of the two flaps, and in the position $\gamma$ the flap 25 is deflected always through the same angle. The switching flaps co-operate with a number of change-over contacts, of which two specimens 26, 27 are shown diagrammatically in FIGURE 5. The contact tongues 26*a*, 27*a* clamped at one end and formed of spring wire are resiliently deflected by way of the insulating pieces 26*b*, 27*b* by the switching flaps and switched over to the counter-contact. The contacts are so arranged that in accordance with the positions $\alpha$, $\beta$, $\gamma$ of the control element, the associated frequency bands are switched on.

In the second embodiment according to FIGURES 16 to 23 with step switching for band selection, the construction and functioning of the unit with regard to channel tunning and channel switching corresponds exactly to the first embodiment, so that the foregoing description of the parts designated by the same references applies also to the second embodiment.

For band pre-selection and band switching in this second embodiment, the adjusting element is constructed as a switch rotor 28 which is rotatably mounted by means of its annular part 28*a* concentrically with the push-button 14. The annular part is provided with internal teeth 28*b*, the pitch of which corresponds to that of the external teeth 14*a* of the push-button. Mounted diametrically opposite each other on the outside of the ring 28*a* are a switching arm 28*c* and a lever arm 28*d*, of which the latter serves for controlling the scale slide.

Inserted in a recess of the arm 28*c* is a rotor spring 29 having a radial arm 29*a* provided with a contact stud and an axis-parallel part 29*b*, formed with a band 29*c*.

In grooves in the front plate or panel 2 are connecting bars 30, 31, 32 for the step contacts, of which the bar 30 carries contacts A1, A2, A3, the bar 31 contacts B1, B2, B3, the bar 32 and contacts C1, C2, C3. All the step contacts are slightly concave.

Secured to the lower side of the front plate is a collector bar 33 on which are located T-shaped extensions 34, 35, 36, having cross-arms 34*a*, 34*b*, 34*c* which are curved inwardly.

In channel switching, which is carried out in the same way as in the first embodiment, the arm 29*b* of rotor spring 29 is pressed against the cross-arm 35*a*, since the segment 9*e* of the switching element slides in front of the bend 29*c* of the rotor spring. Since the switch rotor is on the step B2, the coil of a magnet switch, not shown, is connected to voltage by the bar 31, the same magnet switch in its turn actuating a band switch, for example for television band III.

For application to cases in which the magnet coil is to be energised by only a short current pulse, a switch consisting of a hairpin-shaped return spring 38 for the locking bar 11 and a counter-contact 39, is connected in series with the voltage supply. Since this switch is closed for a short time during channel switching on the locking bar 11 being lifted out, the energising coil always receives only the necessary current pulse.

Pre-selection of the individual frequency bands by means of the push-button 14 is carried out as follows. The push-button is pulled in a direction opposite to that of the arrow and against the action of the spring 16 and is held in this position (FIGURE 17). The external teeth 14*a* of the push-button are thereby brought into engagement with the internal teeth 28*b* of the switch rotor, so that now the switch rotor can be adjusted by means of the push-button from step B2 to step A2 or C2, associated with the UHF band and television band I. After termination of band pre-selection, on release of the push-button, which then return to the inoperative position (FIGURE 16), the coupling between push-button and switch rotor is automatically disengaged. The step switches of the other channel stores may be brought into the desired pre-selection position in the same way.

FIGURE 20 shows the basic diagram for band change-over, the individual cricuit symbols being designated by the same references as in the other figures.

Change-over of the band scales is shown for the same embodiment example with reference to FIGURES 23 to 26.

The front plate 2 of the unit, in its upper part 2*c* shown in FIGURE 25, has guide walls 40, 41 between which scale slides 42, 43, 44 formed of transparent plastics material, are slidably arranged. Each slide (FIGURE 23) comprises three parallel adjacent channel scales denoted by *a*, *b*, *c* and associated with three frequency bands. Rectangular windows 45, 46, 47, having the same width as the individual scales *a*, *b*, *c* are mounted at right angles to the guide walls 40, 41.

The slides are provided with a slot *d* engaged by the lever arms 28*d* of the switch rotors 28, on rotation of which the slides are moved into a position such that the channel scale belonging to the selected band appears in the window.

As will be seen from the sectional view (FIGURE 25), the supporting surfaces for the slides on the back of the front plate plate have a slight inclination to the centre axes of the slides, so that the latter slide over each other when they are moved towards each other. In FIGURES 24 and 25, the three slides 42, 43, 44 are shown in different band positions in each case. In the case of slide 42, the scale *c* appears in the window 45, in the case of slide 43 the scale *c* appears in the window 46, and in the case of slide 44 the scale *b* appears in the window 47. In the case of slides 42, 43, it will be seen that their unwanted scales *b* and *a* or *c* and *b* have been slide over each other in the region between the windows 45, 46. Due to this overlapping of the unwanted slide regions, the windows and other members of the channel stores may be brought correspondingly closer together, so that the overall length of the entire push-button channel selecting unit may be made relatively short.

The guide ledges *e* and *f* of the slides, which slide on the walls 40, 41 of the frame, are extended on both sides, whereby the risk of tilting is avoided when the switch rotor 28, engaging in the slot *d* with a force perpendicular to the longitudinal axis of the slide, displaces the said slide.

In FIGURE 25 the scale indicators situated behind the transparent slides are shown at 48, 49, 50. They are connected to the voltage divider sliders, not shown, and during tuning of the channel stores always move along the scale situated in the window.

FIGURE 26 shows the front view of the complete channel selecting unit on which are also visible, below the windows, the corresponding push-buttons 14.

While the invention has been described in various specific embodiments, the invention should not be limited to the specific embodiments disclosed.

What is claimed is:

1. In a channel selecting unit for high frequency receivers of the type used particularly for television sets, comprising:

a frontplate;

a plurality of mutually releasing push buttoms;

at least two different frequency bands;

a number of channel stores including voltage dividers for capacitance diode tuning and controlling means for said voltage dividers;

channel switching means having contacts;

channel tuning means;

frequency band selection means, by which each channel store is adaptable to the different frequency bands;

a plurality of adjusting elements, one each of said elements being associated with one each of said push buttons;

a plurality of coupling means, one each of said coupling means being associated with one each of the associated ones of said adjusting elements and push buttons;

a plurality of channel indicating means, one each for each of said channels and each including a scale, a window formed in said front plate, and a slide with all of said channel scales being slidably mounted in a corresponding one of said windows in such a manner that the scale of the preselected band only is visible; wherein each channel switching means, channel tuning means, band selection means and channel indicating means in each one of said channel stores is operable by a single one of said rotatable and slidable push buttons;

each one of said push buttons having at least three different positions in its axial direction; a first one of said positions being an inoperative rest position, in which the push button is freely rotatable; a second one of these positions being a pulled-out position and being the frequency band preselection position, in which said adjusting element is coupled by said coupling means and rotated by the respective one of said push buttons by means of the associated one of said adjusting elements, and in which said scale is slid to the position in said window corresponding to the preselected frequency band;

said switching means of a band switch being adjustable to a preselection position associated with the particular frequency band; and a third one of said positions being a depressed pushed-in position and being the working (operative) position, in which the associated one of said channel stores is switched on, said contacts of the preselected band switching means are actuated, and the respective one of said push buttons is coupled with the respective one of said controlling means of the said voltage divider for tuning the respective one of said channel stores.

2. In a push-button channel selecting unit according to claim 1, characterized in that said adjusting element is mounted with an annular part centrically with said push-button and is provided with internal teeth, and in that the said respective push-button is provided with a corresponding toothed crown which, when in the band selecting position, is in engagement with said internal teeth of said said adjusting element.

3. In a push-button channel selecting unit according to claim 1, characterized in that said respective push-button is adapted to be pulled from its inoperative position against the action of a return spring.

4. In a push-button channel selecting unit according to claim 1, characterized in that a control element movable on a circular path and in the direction of its longitudinal axis by means of said rotatable adjusting element, is adapted to be rotated to a pre-selecting position associated with the particular frequency band, and in that said switch contacts serving for band selection are adapted to be actuated by a longitudinal movement of said same control element, which occurs through the longitudinal sliding of said push-button on channel switching, by means of at least one pivotally connected intermediate element.

5. In a push-button channel selecting unit according to claim 4, characterized in that said control element is slidably mounted by means of a rear guide pin in a sleeve of said adjusting element parallel to the push-button axis, and is guided by means of a lateral recess on a segment-shaped part of a switching element which, on channel switching, is pressed into the arrested operative position by said push-button.

6. In a push-button channel selecting unit according to claim 4, characterized in that said control elements of a plurality of said push-buttons co-operate with a hingedly mounted, spring-loaded switching flap, common to all of said channel stores, said flap having a bent end which lies in the range of action of pushers of said control elements and is provided with stepped receses for obtaining different angles of deflection of the switching flap corresponding to the individual frequency bands.

7. In a push-button channel selecting unit according to claim 4, characterized in that said control elements of a plurality of said push-buttons co-operate with two hingedly mounted, spring-loaded switching flaps, common to all said channel stores, which flaps, in the range of action of pushers of said control elements have recesses such that each pusher according to the band selecting position of the respective control element in the switched-on position, deflects the first or the second or none of the two switching flaps.

8. In a push-button channel selecting unit according to claim 4, characterized in that a frequency band switch is constructed as a sliding switch, having a switching slide adjustable to different travel or stroke positions, corresponding to the individual frequency bands, by the deflection of a switching flap.

9. In a push-button channel selecting unit according to claim 4, characterized in that a frequency band switch comprises a number of switch sets with resilient contact tongues adapted, through the medium of insulating pieces, to be actuated by the deflection of switching flaps.

10. In a push-button channel selecting unit according to claim 4, characterized in that a frequency band switch comprises a number of switch sets with resilient contact wires adapted, through the medium of insulating pieces, to be actuated by the deflection of switching flaps.

11. In a push-button channel selecting unit according to claim 1, characterized in that rotatable adjusting elements of the channel stores are constructed as switch rotors of step switches, having step contacts corresponding to each other, the said corresponding step contacts associated with a frequency band being always connected together, and in that conductive connection between a collector bar of said step switches and counter-contacts, mounted on said switch rotors and lifted off in the inoperative position of the channel stores, is established by their resilient deflection with a segment-shaped part of a switching element which, on channel switching, is moved by said push-button to the arrested switched-on position.

12. In a push-button selecting unit according to claim 11, characterized in that said movable contact of said switch rotor consists of a radial part co-operating with said step contacts, and a part serving as counter-contact for said collector bar, approximately parallel to the rotor axis and provided with a bend co-operating with the segment-shaped part of said switching element on displacement of the latter to the arrested switched-on position.

13. In a push-button channel selecting unit according to claim 11, characterized in that said collector bar of said step switch in the range of action of the corresponding ones of rotor contacts has T-shaped extensions with cross-arms, said cross-arms being curved to fit the circular movement of said rotor contacts.

14. In a push-button channel selecting unit according to claim 11, characterized in that said step contacts of said step switches together with their connections are formed as printed conductor series on an insulating plate.

15. In a push-button channel selecting unit according to claim 11, characterized in that said step contacts and their connections are made in one piece of conductive material and are inserted in suitable grooves in a unit frame.

16. In a push-button channel selecting unit according to claim 11, characterized in that the contact surfaces of said step contacts are embossed in trough fashion.

17. In a push-button selecting unit according to claim 11, characterized in that it has a switch which, on displacement of a locking bar during channel switching, is colsed for a short time.

18. In a push-button channel selecting unit according to claim 11, characterized in that said adjusting element has a lever arm which engages by means of a pin in a recess of said scale slide.

19. In a push-button channel selecting unit according to claim 11, characterized in that said scale slides are arranged in roof-tile fashion with a small inclination to the plane of their centre axes and with mutual overlapping of partial regions.

20. In a push-button channel selecting unit according to claim 1, characterized in that guide ledges of said scale slides are situated outside the windows and extended on both sides.

References Cited

UNITED STATES PATENTS

| | | | |
|---|---|---|---|
| 2,820,366 | 1/1958 | Spakman ---------- | 74—10.33 |
| 3,195,080 | 7/1965 | Kenwright et al. --- | 74—10.29 X |
| 3,276,274 | 10/1966 | Machts et al. ----- | 74—10.27 X |
| 3,390,581 | 7/1968 | Henry ------------- | 334—7 X |

HERMAN K. SAALBACH, Primary Examiner

P. L. GENSLER, Assistant Examiner

U.S. Cl. X.R.

334—87; 200—159; 325—455, 459; 74—10.27; 334—15